United States Patent
Eidloth et al.

(10) Patent No.: US 9,625,565 B2
(45) Date of Patent: Apr. 18, 2017

(54) METHOD AND APPARATUS FOR DETERMINING THE POSITION AND ORIENTATION OF A MOBILE TRANSMITTER

(75) Inventors: Andreas Eidloth, Erlangen (DE); Jörn Thielecke, Erlangen (DE)

(73) Assignees: Friederich-Alexander-Universität Erlangen-Nurnberg, Erlangen (DE); Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 1128 days.

(21) Appl. No.: 13/809,341

(22) PCT Filed: Jul. 8, 2011

(86) PCT No.: PCT/EP2011/003565
§ 371 (c)(1),
(2), (4) Date: Mar. 25, 2013

(87) PCT Pub. No.: WO2012/004010
PCT Pub. Date: Jan. 12, 2012

(65) Prior Publication Data
US 2013/0207845 A1 Aug. 15, 2013

(30) Foreign Application Priority Data
Jul. 9, 2010 (EP) ..................................... 10075298

(51) Int. Cl.
*G01S 3/02* (2006.01)
*G01S 5/02* (2010.01)

(52) U.S. Cl.
CPC .......... *G01S 5/0294* (2013.01); *G01S 5/0247* (2013.01)

(58) Field of Classification Search
CPC .............................. G01S 5/0294; G01S 5/0247
(Continued)

(56) References Cited

U.S. PATENT DOCUMENTS 3,540,045 A 11/1970 Taylor
4,737,794 A * 4/1988 Jones ...................... F41G 3/225
342/386

(Continued)

FOREIGN PATENT DOCUMENTS

EP 1556713 A1 7/2005
EP 2000816 A2 12/2008
(Continued)

OTHER PUBLICATIONS

Eidloth, Andreas et al., "An Orientation Measurement Principle for Time of Arrival Radio Localisation Systems", Proceedings of Enc-GNSS 2009, May 6, 2009, Naples, Italy, XP002627375.
(Continued)

*Primary Examiner* — Frank J McGue
(74) *Attorney, Agent, or Firm* — Faegre Baker Daniels LLP

(57) ABSTRACT

A method and an apparatus for determining the position and orientation of a mobile transmitter that has at least two linearly polarized antennas arranged at a predefined angle to one another. A plurality of receivers, which can be synchronized with the mobile transmitter and of which the position is known, each receive transmitter signals of predefined carrier frequency via a circularly polarized antenna. A field-theoretical model of the transmission path between the mobile transmitter and receivers is set up and defines the carrier phase measured values, the field-theoretical model is implemented in a Kalman filter, and the receiver signals are evaluated in terms of carrier phase measured values and/or time of arrival values. The position and orientation of the mobile transmitter are determined in the Kalman filter with use of the field-theoretical model and the carrier phase measured values and/or time of arrival values established from the receiver signals.

13 Claims, 2 Drawing Sheets

(58) Field of Classification Search
USPC .......................................................... 342/465
See application file for complete search history.

(56) References Cited

U.S. PATENT DOCUMENTS

| | | | |
|---|---|---|---|
| 4,914,598 A * | 4/1990 | Krogmann | G01C 21/16 244/177 |
| 5,056,106 A | 10/1991 | Wang et al. | |
| 6,061,631 A | 5/2000 | Zhang | |
| 6,119,013 A * | 9/2000 | Maloney | G01S 5/12 455/456.2 |
| 7,123,187 B2 | 10/2006 | Deimert et al. | |
| 2003/0132880 A1 | 7/2003 | Hintz | |
| 2005/0184192 A1 * | 8/2005 | Schneider | G01S 5/0247 244/3.1 |
| 2006/0273905 A1 | 12/2006 | Choi et al. | |
| 2008/0303714 A1 * | 12/2008 | Ezal | G01C 21/005 342/357.22 |
| 2010/0079334 A1 | 4/2010 | Roh et al. | |
| 2010/0117894 A1 | 5/2010 | Velde et al. | |
| 2011/0122024 A1 * | 5/2011 | Eidloth | G01S 3/146 342/365 |

FOREIGN PATENT DOCUMENTS

| | | |
|---|---|---|
| JP | 200780102 A | 3/2007 |
| JP | 2008199190 A | 8/2008 |
| JP | 2008300937 A | 12/2008 |
| WO | 2010009906 A1 | 1/2010 |

OTHER PUBLICATIONS

European Search Report issued in EP Application No. 10075298.9, Publication No. 2405281, mailed Mar. 23, 2011, 7 pages.
International Search Report and Written Opinion issued in PCT/EP2011/003565, dated Jan. 24, 2012, 12 pages, English translation.
Izadpanah, A., et. al. GPS Multipath Parameterization Using the Extended Kalman Filter and a Dual LHCP/RHCP Antenna. Ion GNSS Session C2:1-9, Sep. 16-20, 2008.

* cited by examiner

METHOD AND APPARATUS FOR DETERMINING THE POSITION AND ORIENTATION OF A MOBILE TRANSMITTER

CROSS-REFERENCE TO RELATED APPLICATION

The present application is a national phase application of PCT application PCT/EP2011/003565, filed pursuant to 35 U.S.C. §371, which claims priority to European Application EP 10 07 5298.9, filed Jul. 9, 2010. Both applications are incorporated herein by reference in their entirety.

TECHNICAL FIELD

The invention relates to a method and an apparatus for determining the position and orientation of a mobile transmitter.

BACKGROUND

A method and an apparatus for continuous real-time tracking of the position of at least one mobile transmitter is known from EP 1 556 713 B1, wherein a plurality of receivers of a stationary receiver and signal processing network receive the signals emitted by the transmitter. Times of traveling, or what are known as TOA (time of arrival) values, are determined between the transmitter and each of the receivers from the receiver signals, wherein, for example with 12 TOA values from 12 stationary receivers, 11 time differences, or what are known as TDOA (time difference of arrival) values, are formed by reference to one of the receivers, from which the respective position of the transmitter is calculated by hyperbolic triangulation, which is implemented in a Kalman filter. This method and this apparatus have been used for example for real-time tracking of a ball and/or of players on a playing field, for example, on a football field.

With such a known system, a rotating mobile transmitter, which for example is arranged in a ball, generates distorted carrier phase measured values, which then distort the position result for the transmitter. This interference increases as the ball rotates faster. This effect can be attributed to the selection of the antennas used. The transmitter emits linearly polarized waves, as is also the case, for example, with a linear dipole. Circularly polarized antennas are used on the receiver side, wherein the plane of polarization is also rotated by the rotation of the ball or of the transmitter, which is perceived at the receiver as a shift in the carrier frequency. The measured values of the carrier phase derived from the carrier frequency are distorted by this interference effect and are therefore no longer a reliable measured quantity for the distance or change thereto. If the measured carrier phase values are taken into account in the position calculation, this results in a position error to a greater or lesser extent. To solve this problem, it is possible to dispense with the carrier phase measurement or the carrier phase measured values in the position calculation, however the positional result would then be considerably impaired, since only the relatively inaccurate code phase measurement of the Traveling times of the signals would be used.

The physical effect occurring in conjunction with the cited prior art is also present in other systems, for example in the GPS system, wherein, in the GPS system, the error is eliminated since the phase difference is formed between the measured values of two satellites. A precondition in this case is that the receiving antenna is only rotated about the vertical axis, which is generally the case. In the localization method according to the above-cited prior art, the transmitter rotates completely randomly, which is why the compensation of the error applied with the GPS system is not possible.

A further prior art in which the aforementioned physical effect is used for the orientation measurement is U.S. Pat. No. 3,540,045, in which the alignment of the plane of polarization in the satellite communication is established and controlled. In this case, the angle of the plane of polarization of a satellite signal is measured using a turnstile antenna, which can simultaneously receive right-hand and left-hand circularly polarized electromagnetic field components. U.S. Pat. No. 7,123,187 is used to determine the alignment of a GPS receiver, wherein a "standard GPS antenna configuration" is used, that is to say a right-hand circularly polarised antenna at the transmitter and receiver. In this case, two carrier frequencies of the GPS system are used, wherein the two components can be determined or separated from the different phase changes during rotation, during which both phase measured values change in a similar manner, and from the change in distance, with which the phase changes are dependent on the respective wavelength.

SUMMARY

In some embodiments, the invention is directed to a method and an apparatus for determining the position and the orientation of a mobile transmitter, with which the measurement errors caused by a random rotation of a mobile transmitter are avoided and therefore the determination of the position of the transmitter is improved.

Since, for a system comprising a mobile transmitter having at least two linearly polarized transmission antennas and a plurality of receivers each having just one circularly polarized antenna, a field-theoretical model of the transmission path is set up between the mobile transmitter and the respective receiver, the carrier phase measured value is determined from a known position and orientation of the mobile transmitter and the field-theoretical model is implemented in a Kalman filter, then the receiver signals are evaluated in terms of the carrier phase values and/or the arrival times of the signal to determine the distance between the transmitter and receiver, and the position and orientation of the mobile transmitter are determined in the Kalman filter with use of the field-theoretical model and the carrier phase measured values and/or arrival times established from the receiver signals, it is possible in accordance with the invention to establish distance and orientation information using the apparatus forming a localization system and to separate said pieces of information from one another. Positional errors during rotation of the mobile transmitter can thus be overcome, and orientation and rotation rate information can be obtained, for example to determine the spin of a ball carrying the mobile transmitter, and additional hardware for estimating orientation can be avoided.

Due to the use of two linearly polarized antennas at a transmitter, three degrees of freedom can be determined for complete orientation. Only one circularly polarized receiving antenna is provided on the receiver side and may either be right-hand circularly polarized (RHCP) or left-hand circularly polarized (LHCP), whereby the hardware requirement of the receiver can be considerably reduced.

The reduction in hardware at each receiver is disadvantageous for direct observability during the distance and orientation change, since only one measured quantity is available for the two unknown variables. By using the quantities of all receivers of the entire localization system as input quantities in the Kalman filter, position coordinates and/or the orientation can be determined, however.

The setting of the field-theoretical model is repeated for each transmitting antenna of the mobile transmitter, that is to say for the different transmitting antenna alignments in relation to each receiver.

Due to the use of two transmitting antennas, which are preferably arranged at the same distance from the respective receiver, two independent phase measured values are available at the receiver, the difference between said phase measured values only being determined by the different angular alignment of the transmitting antennas. If the two transmitting antennas have a distance difference, also distance differences affecting the phase measured values are observed on rotating the mobile transmitter. Of course, this can be taken into account in the calculations.

In accordance with the invention, the field-theoretical model is set up by determining an electromagnetic field generated by a transmitting antenna, wherein a known position and orientation of this transmitting antenna is predefined, furthermore, the field strength generated by the transmitting antenna is established at the receiver of known position, and the complex currents induced in the circular antenna of the receiver are determined in a vector field representation with use of the components of field strength, wherein the circular antenna is modelled by means of two linear dipoles, and the carrier phase angle is finally derived from the currents of the receiving antenna or from the entire field-theoretical model as a carrier phase measured value. This description applies to a transmitting antenna in relation to one receiver, whilst the same applies accordingly to the second transmitting antenna in relation to the one receiver, and the calculation is repeated for all receivers.

When determining the induced currents or the induced overall current by means of the model of the circular antenna from two linear dipoles, a 90° shift of a phase shifter completing the model is taken into account.

The electromagnetic field generated by a transmitting antenna with known position and orientation can be determined with use of the field equations of a Hertzian dipole or by real measured values of the field strength distribution of the transmitting antenna over a sphere, which are recorded in a table.

In accordance with the invention, to convert a transmitter coordinate system to a reference coordinate system, a position vector and rotational matrices in the form of cosine matrices or quaternions are used for the orientation, wherein the latter can advantageously be used in Kalman filters, since fewer states have to be estimated, which reduces the time for the calculation.

For the necessary synchronization between transmitter and receiver, it is possible to use a further receiver of known position, that is to say a synchronization receiver that is synchronized with the receivers, wherein the time of arrival differences and/or carrier phase differences between the receiver signals and the transmitter are calculated, or synchronization can be undertaken by continuous estimation of the deviation between the clocks present in the transmitter and receiver. Lastly, atomic clocks can also be used for transmitters and receivers and have a high synchronisation accuracy. Since a plurality of receivers are provided in the system, there is no need to provide additional synchronization receivers.

The carrier phase measured values and the time of arrival values are preferably corrected by means of a calibration value, which is generated with the aid of a reference transmitter of known orientation and position.

In accordance with the invention, with an apparatus for determining the position and orientation of a mobile transmitter, this transmitter has at least two linearly polarized antennas arranged at a predefined angle to one another, and the apparatus comprises a plurality of receivers (at least three) that can be synchronized with the mobile transmitter, of which the positions are known and which each have a circularly polarized antenna (a Kalman filter), in which a field-theoretical model of the transmission paths between the transmitter and receivers is implemented, by means of which expected carrier phase measured values can be determined, and an evaluation device for evaluating the receiver signals supplied by the receivers in terms of carrier phase measured values and/or phase difference angle and/or time of arrival values, and the Kalman filter is further designed to determine the position and orientation of the mobile transmitter with use of the field-theoretical model and from the receiver signals supplied from the receivers, each having a circularly polarized antenna, and from carrier phase values and/or time of arrival values specific to the evaluation unit. Both the orientation and the position of the mobile transmitter can thus be established by means of the apparatus according to the invention without position errors, even with rotating transmitters, with a relatively reduced amount of hardware.

An "unscented Kalman filter" is particularly preferably used as a Kalman filter, since it can handle non-linear measurement equations. It is also conceivable to use what is known as an extended Kalman filter, although additional mathematical calculations are then necessary.

BRIEF DESCRIPTION OF THE FIGURES

Exemplary embodiments of the invention are illustrated in the drawing and will be explained in greater detail in the following description. In the drawing.

DETAILED DESCRIPTION

Figure 1:
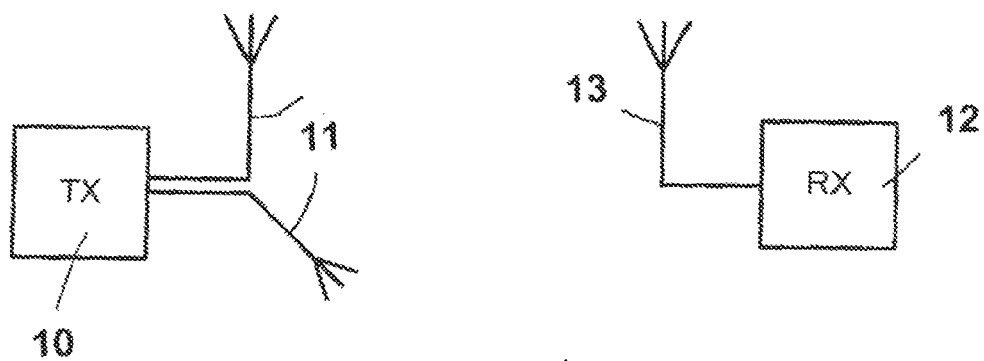
FIG. 1 shows a schematic view of part of the apparatus according to the invention with a transmitter and a receiver.

A schematic illustration of a mobile transmitter 10 and a receiver 12, as are used in a localization system (FIG. 3) to determine the position and orientation of the mobile transmitter 10, is shown in FIG. 1. Two linearly polarized antennas 11 are connected to the transmitter 10 and are rotated relative to one another by a known angle, preferably 90°, and therefore emit differently oriented wave fronts. As mentioned, the position of the transmitter can be changed relative to the stationary receiver 12, to which only one circularly polarized antenna 13 is connected. It is not crucial for the construction of the apparatus according to the invention whether this is right-hand or left-hand circularly polarized, but the direction of rotation of the field must be known. In the exemplary embodiment, the transmitting antennas 11 are arranged at the same distance from the receiver 12, that is to say they have the same phase center, although an identical phase center of the two transmitting antennas is not necessary for the arrangement of the method and/or apparatus according to the invention.

The transmitter 10 transmits transmitter signals alternately or simultaneously via its antennas 11, said signals having a predefined carrier frequency in different linear planes of polarization. The received signals should then be separated at the receiver 12 via a multiplex method, possibly with simultaneous transmission of transmitter signals. An evaluation device is connected to the receiver 12 (see FIG. 3) and evaluates the receiver signals in accordance with the carrier phase values and/or phase angle differences and time of arrival values of the transmitted signals, as will be described further below. The carrier phase measured values contain information concerning distance and orientation. More specifically, each phase measurement value is composed of one component dependant on the distance between the transmitter 10 and receiver 12 and a second component dependant on the relative orientation between the transmitter and receiver. Due to the two transmitting antennas 11, two independent phase measured values are available at the receiver 12, the difference between said phase measured values only being determined by the different alignment of the transmitting antennas, since these are both arranged at the same distance from the receiver in the exemplary embodiment. A difference angle between the two transmitting antennas 11 can be established from the viewpoint of the receiver 12, the magnitude of said angle being dependent on the orientation of the transmitter 10, wherein this difference angle can be measured via the difference between the two carrier phase measured values of the receiver signals.

Figure 2:
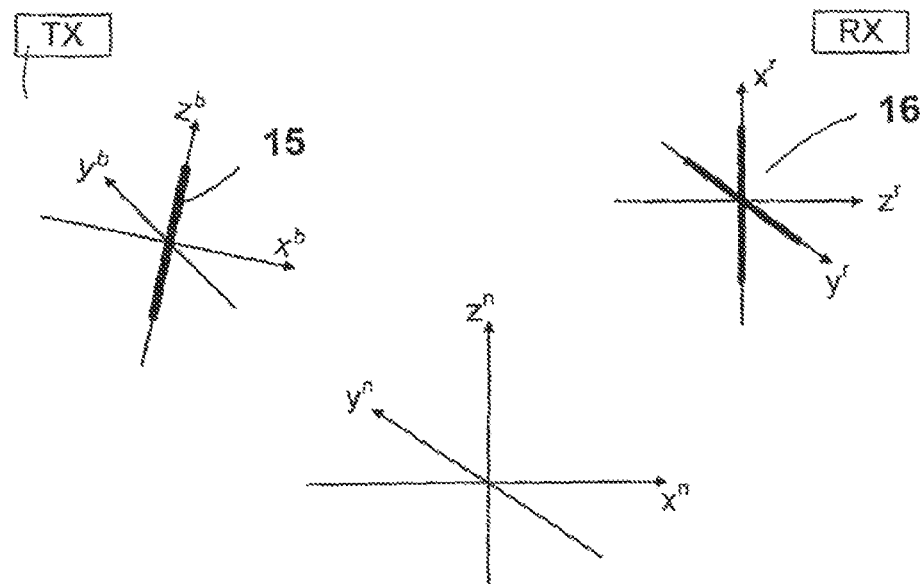
FIG. 2 shows the illustration of the coordinate systems used for the field model.

So as to assign a clear orientation to this difference angle, the apparatus according to the invention (see FIG. 3) has, in its evaluation device 4, a Kalman filter, in which a field-theoretical model is implemented, which is set up based on the construction according to FIG. 2. The model models a linear transmitting antenna 15 and a circular receiving antenna 16, which is formed from two turnstile antennas. The transmitting antenna 15 is illustrated in a z-directed manner in what is known as the body-frame (b-frame), whereas the coordinate system of the receiving antenna is what is known as the r-frame (receiver-frame). These two coordinate systems can be shifted and rotated relative to a reference system, which is referred to as the navigation-frame (n-frame).

To determine the model, the position of the transmitter 10 or of the transmitter antenna 11 is presupposed as a position vector, and the alignment or orientation of the transmitter 10 or transmitter antenna 11 relative to the reference coordinate system (n-frame) is presupposed in the form of a rotational matrix or cosine matrix or as a quaternion. Furthermore, the position as a position vector and the alignment of the receiving antenna 13 or of the receiver 12 are known, wherein, in this case too, the position vector and a rotational matrix or a quaternion are used for conversion between the reference coordinate system and the receiver-frame. The position of the receiving antenna 16 is first established from the viewpoint of the transmitting antenna 15, that is to say illustrated in b-frame coordinates, wherein the aforementioned rotational matrix or quaternion is used. In addition, the electromagnetic field generated by the transmitting antenna 15 or one of the transmitting antennas 11 is determined in spherical coordinates, wherein this can be carried out with the aid of field equations of the Hertzian dipole. Another possibility is to measure the field in real terms as "antenna patterns" and to record this in the form of a table, wherein this has the advantage that real antenna characteristics can be used, which deviate from the ideal description.

The field radiated by the transmitting antenna is then calculated at the position of the receiver, wherein the previously determined position of the receiver from the viewpoint of the transmitter or the transmitter antenna and field equations of the radiated electromagnetic field are used. The field strength at the receiver generated by the transmitter or by the transmitting antenna is described mathematically by complex-valued vectors, wherein a vector field image in relation to the reference coordinate system (n-frame) is obtained after coordinate transformation. The alignment of the receiving antenna is then taken into account and, so as to form a circularly polarized antenna from the two dipoles in accordance with FIG. 2, a phase shifter with 90° shift is provided and the alignment is illustrated likewise in coordinates of the reference coordinates system with the aid of the rotational matrix. The induced currents for each dipole of the receiving antenna can then be established from the field strengths at the aligned receiving antenna and can be suitably combined with the phase shifter to form an induced current of the circular receiving antenna 13. The phase angle can ultimately be extracted from the complex illustration then provided of the current of a circular receiving antenna, which is produced by a linear transmitting antenna, said phase angle corresponding to the measured value for the carrier phase. The entire measurement equation is thus then described for the phase measured values according to position and orientation of a transmitting antenna. The above-described determination is repeated for the second transmitting antenna in relation to the receiver 12 in FIG. 1. Since a plurality of receivers are provided in the apparatus according to the invention (see FIG. 3), the determination process is undertaken in the same manner for each receiver.

This field model thus described is then implemented as a measurement model in a Kalman filter, which is provided in the evaluation apparatus 4 and is designed as an unscented Kalman filter. A Kalman filter is a state filter, that is to say if states can be recognized in a system and a calculation specification as to how the measured values can be calculated from the states (field model) is predefined, the Kalman filter can then back-calculate the states from the measured values. In the system according to FIG. 1 with the field model implemented in the evaluation device 4, that is to say in the Kalman filter, at least the three position coordinates of the transmitter 10 and the four states of the quaternion, as a result of which the orientation is given, are used as states. If the receiver signals, at least at three receivers according to the receiver 12, which are initiated by the moving transmitter 10, are thus evaluated in the evaluation device 4 in terms of the carrier phase measured values and possibly the time of arrival values and are fed to the Kalman filter as measured quantities, this can thus be used to back-calculate the position and orientation of the transmitter, wherein this occurs iteratively, since, starting from a start position, the Kalman filter attempts to adapt the state vector in such a way that the difference between the measurement and the predefined expectation is minimal as a result of the field model used as a measurement model.

It is assumed in the above embodiments that the transmitter 10 and receiver 12 are synchronized to one another. Normally, transmitter and receiver clocks are not interconnected however and therefore do not run synchronously. This results in a frequency offset between the transmitter and receiver and consequently in a distortion of the phase measured values. So as to avoid this, a further receiver of which the position is known can be provided in addition to the arrangement illustrated in FIG. 1. Of course, this receiver must be synchronized with the other receiver. This second receiver would likewise receive the transmitter signal and, by use of the TDOA method, the unknown transmit time can be eliminated by subtracting two measured values. The clock deviation between the transmitter and receiver can also be estimated continuously, wherein this is also integrated or modelled in the Kalman filter for the determination of position and orientation.

Lastly, a calibration that corrects the phase measured values, of which the absolute value has been distorted, is also necessary. To this end, a reference transmitter of known position and orientation may be provided, of which the measured values from the receiver signals are compared with the respective expected values. The difference between the measurement and expectation is the calibration value, which is then taken into account in all other measurements.

Figure 3:
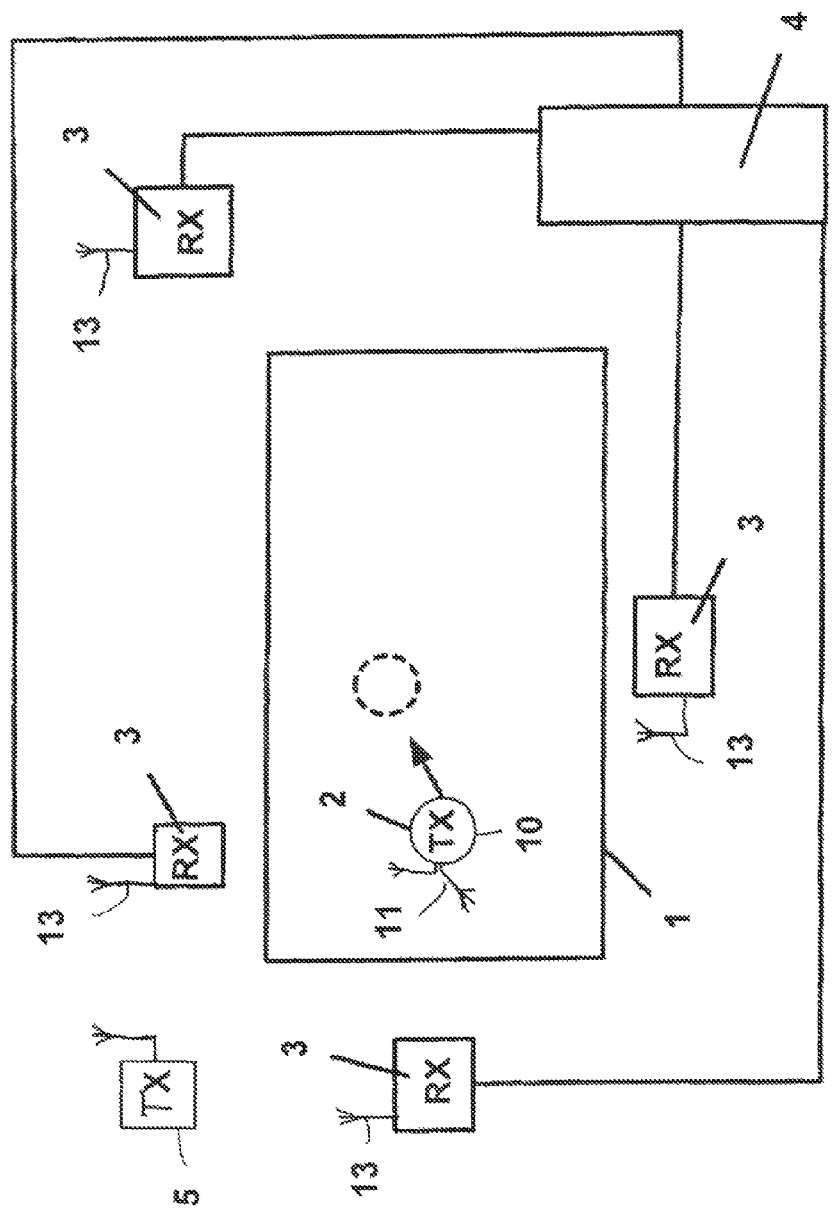
FIG. 3 shows a construction of the apparatus according to the invention as a localization system for a ball with a mobile transmitter on a playing field with the apparatus according to the invention.

In FIG. 3 the apparatus according to the invention is provided as a localization system, which is used to continuously track a ball 2 with a transmitter 10, which moves over a playing field. In the exemplary embodiment, four receivers 3 are arranged in a stationary manner around the playing field and correspond to the receiver 12 and are synchronized chronologically with one another, in the exemplary embodiment are connected to a common clock source, and are connected via fixed lines, radio or other transmission means to the evaluation device 4 having one or more processors. Of course, more receivers can be provided so as to track the position of the object 2 in a particularly precise manner. The processor or the evaluation device 4 contains the Kalman filter, as mentioned, and the receivers 3 have the circularly polarized antenna, whereas the transmitter 10 provided in the ball 2 has the two linearly polarized antennas 11 rotated by 90°. In this case, a reference transmitter 5 of fixed position and orientation is indicated and can be used for the calibration. In the apparatus illustrated in FIG. 3, all receivers 3 are connected to a common clock and therefore run synchronously. The transmitter 10 in the ball 2 has no access to this clock, and the measurement error produced must therefore be corrected. This occurs by subtracting the measured values from two receivers 3, since both are subject to the same frequency shift.

The transmitter 10 transmits alternately from one of the two transmitting antennas 11 by the TDMA method. However, other multiplex methods, such as CDMA, FDMA or the like, are also conceivable.

As mentioned, all receivers 3 receive the transmitter signals and the evaluation device establishes, from the receiver signals of all receivers 3, the respective carrier phase measured values and times of arrival, which are fed to the Kalman filter as input quantities, said Kalman filter outputting three position coordinates and four states of the quaternion/the orientation.

Further parameters, such as speed, acceleration, rotation rate, frequency shift and further measurement errors, can also be modelled in the Kalman filter.

The invention claimed is:

1. A method for determining the position and orientation of a mobile transmitter, which has at least two linearly polarized antennas arranged at a predefined angle to one another, wherein a plurality of receivers, which can be synchronized with the mobile transmitter and of which the position is known, each receive transmitted signals of predefined carrier frequency via a circularly polarized antenna, said method comprising the following steps:
setting up a field-theoretical model for defining expected carrier phase measured values in which transmission paths between the at least two linearly polarized antennas of the mobile transmitter and the circularly polarized antennas of the plurality of receivers are modeled;
implementing the field-theoretical model in a Kalman filter;
evaluating the signals of the receivers in terms of carrier phase measured values or the carrier phase measured values and measured time of arrival values; and
determining the position and orientation of the mobile transmitter in the Kalman filter with use of the carrier phase measured values or the carrier phase measured values and the measured time of arrival values established from the signals of the receivers as measured quantities for the Kalman filter and the expected carrier phase measured values defined by the field theoretical model as expected values for the Kalman filter.

2. The method according to claim 1, wherein setting up the field-theoretical model comprises the following steps:
determining an electromagnetic field generated by a transmitting antenna, wherein a known position and orientation of this transmitting antenna is predefined;
establishing a field strength generated by the transmitting antenna at the circularly polarized antenna of the respective receiver of known position in a vector field representation of the electromagnetic field;
determining complex currents induced in the circular polarized antenna of the respective receiver with use of components of the field strength in the vector field representation, wherein the circularly polarized antenna is modelled by two linear dipoles; and
defining the phase angle as the expected carrier phase measured value from the induced complex currents.

3. The method according to claim 2, wherein, when determining the induced complex currents by means of the model of the circularly polarized antenna from two linear dipoles, a 90° shift of a phase shifter is taken into account.

4. The method according to claim 2, wherein the electromagnetic field generated by a transmitting antenna is determined with use of field equations of a Hertzian dipole or by values measured in real terms of the field strength distribution of the transmitting antenna over a sphere, which are recorded in a table.

5. The method according to claim 1, wherein rotational matrices in the form of cosine matrices or quaternions are used to convert a transmitter coordinate system and a receiver coordinate system into a reference coordinate system.

6. The method according to claim 1, wherein the field-theoretical model for each transmitting antenna is set up in relation to each receiver.

7. The method according to claim 1, wherein the transmitter and receiver are synchronized via use of the TDOA method including by means of an additional synchronization receiver of known position and/or by continuous estimation of deviations between clocks provided in the transmitter and receiver.

8. The method according to claim 1, wherein the phase measured values and/or time of arrival values are corrected via a calibration value, which is generated with use of a reference transmitter of known orientation and position.

9. The method according to claim 1, wherein the Kalman filter determines position coordinates and the orientation from the fed carrier phase measured values and time of arrival values of all receivers.

10. An apparatus for determining the position and orientation of a mobile transmitter, which has at least two linearly polarized antennas arranged at a predefined angle to one another, the apparatus comprising:

a plurality of receivers which can be synchronized with the mobile transmitter, and of which the position is known and which each have a circularly polarized antenna for receiving a transmitted signal of predetermined carrier frequency;

a Kalman filter, in which a field-theoretical model for defining expected carrier phase measured values is implemented, the field theoretical model modeling transmission paths between the at least two linearly polarized antennas of the mobile transmitter and the circularly polarized antennas of the plurality of receivers; and an evaluation device for evaluating the receiver signals supplied by the receivers in terms of carrier phase measured values or carrier phase measured values and time of arrival values, wherein the Kalman filter is designed to determine the position and orientation of the mobile transmitter with use of the carrier phase measured values or the carrier phased measure values and the measured time of arrival values established from the signals of the receivers as measured quantities for the Kalman filter and the expected carrier phase measured values defined by the field theoretical model as expected values for the Kalman filter.

11. The apparatus according to claim 10, wherein the Kalman filter is an unscented Kalman filter.

12. The apparatus according to claim 10, wherein at least three receivers are provided to form a localization system of the movable transmitter.

13. The apparatus according to claim 12, wherein the at least three receivers are interconnected in a phase-locked manner.

* * * * *